United States Patent

Kuramoto et al.

(10) Patent No.: US 8,559,453 B2
(45) Date of Patent: Oct. 15, 2013

(54) ROUTING APPARATUS

(75) Inventors: Michio Kuramoto, Kawasaki (JP);
Kanta Yamamoto, Kawasaki (JP);
Yasuyuki Mitsumori, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 534 days.

(21) Appl. No.: 12/718,311

(22) Filed: Mar. 5, 2010

(65) Prior Publication Data

US 2010/0158030 A1 Jun. 24, 2010

Related U.S. Application Data

(63) Continuation of application No. PCT/JP2007/067262, filed on Sep. 5, 2007.

(51) Int. Cl.
*H04L 12/28* (2006.01)

(52) U.S. Cl.
USPC .......................................... 370/419; 370/401

(58) Field of Classification Search
None
See application file for complete search history.

(56) References Cited

U.S. PATENT DOCUMENTS

| | | | |
|---|---|---|---|
| 6,735,198 B1* | 5/2004 | Edsall et al. ................ | 370/389 |
| 7,706,298 B2* | 4/2010 | Fernando et al. ........... | 370/252 |
| 7,808,889 B1* | 10/2010 | Howard ....................... | 370/217 |
| 2003/0214931 A1 | 11/2003 | Nakayasu | |
| 2004/0120327 A1* | 6/2004 | Son et al. ................. | 370/395.53 |
| 2007/0268915 A1* | 11/2007 | Zelig et al. ................. | 370/401 |
| 2007/0288653 A1* | 12/2007 | Sargor et al. ............... | 709/245 |
| 2008/0049764 A1* | 2/2008 | Solomon et al. ........... | 370/401 |
| 2008/0075076 A1* | 3/2008 | Shimada ...................... | 370/389 |
| 2009/0279549 A1* | 11/2009 | Ramanathan et al. ..... | 370/395.4 |
| 2010/0085982 A1* | 4/2010 | Martinotti et al. .......... | 370/420 |
| 2010/0158030 A1* | 6/2010 | Kuramoto et al. .......... | 370/401 |
| 2012/0008633 A1* | 1/2012 | Kuramoto et al. .......... | 370/401 |

FOREIGN PATENT DOCUMENTS

| | | |
|---|---|---|
| JP | 2001-53775 | 2/2001 |
| JP | 2003-339077 | 11/2003 |
| JP | 2005-86668 | 3/2005 |
| JP | 2005-184595 | 7/2005 |
| JP | 2005-354598 | 12/2005 |

OTHER PUBLICATIONS

International Search Report dated Oct. 23, 2007, from the corresponding International Application.
Japanese Office Action dated Apr. 12, 2011, from corresponding Japanese Application No. 2009-531046.
International Preliminary Report on Patentability and Written Opinion of the International Searching Authority dated Mar. 30, 2010, from the corresponding International Application.

* cited by examiner

*Primary Examiner* — Marsha D Banks Harold
*Assistant Examiner* — Christopher Wyllie
(74) *Attorney, Agent, or Firm* — Katten Muchin Rosenman LLP

(57) ABSTRACT

A routing apparatus couples to another routing apparatus using a trunk formed by a plurality of channels, and has a plurality of input and output cards to input and output frames. Each input and output card includes a management table registering a transmitting source address, destination information, and a trunk attribute indicating whether a channel used for a transmission has a trunk structure, a learning request part searching the management table using a transmitting source address within a frame that is transmitted via the channel, and generating and supplying learning request information having information that is obtained by searching the management table to another input and output card, if the channel used for the transmission has the trunk structure, and a registering part registering learning request information supplied thereto in the management table.

15 Claims, 13 Drawing Sheets

FIG.5

| SEARCH KEY | DATA IN CORRESPONDENCE WITH SEARCH KEY | | | |
|---|---|---|---|---|
| | DESTINATION INFORMATION | | LEARNING REQUEST INFORMATION GENERATION MANAGEMENT BITS | LEARNING REQUEST INFORMATION ISSUANCE FLAG |
| TRANSMITTING SOURCE ADDRESS | DESTINATION PORT NUMBER | DESTINATION CARD NUMBER | | |
| aa.bb.cc | 224 | 121 | 001 | 1 |
| dd.ee.ff | 221 | 120 | 110 | 0 |
| 00.00.11 | 229 | 131 | 000 | 0 |
| 10.17.20 | 226 | 130 | 101 | 1 |

FIG.6

| SEARCH KEY | DATA IN CORRESPONDENCE WITH SEARCH KEY | |
|---|---|---|
| TRANSMISSION SOURCE ADDRESS | TRUNK NUMBER | LEARNING REQUEST PRIORITY |
| aa.bb.cc | 001 | 100 |
| dd.ee.ff | 110 | 011 |
| 00.00.11 | 110 | 011 |

FIG.9

|  |  | COMPARISON RESULT BETWEEN VALUES OF LEARNING REQUEST INFORMATION GENERATION MANAGEMENT BITS & TRUNK COUNTER | |
| --- | --- | --- | --- |
|  |  | MATCH | NO MATCH |
| LEARNING REQUEST INFORMATION ISSUANCE FLAG | 1 | NO LEARNING REQUEST INFORMATION GENERATED | GENERATE LEARNING REQUEST INFORMATION |
|  | 0 | GENERATE LEARNING REQUEST INFORMATION | GENERATE LEARNING REQUEST INFORMATION |

FIG.10

| DESTINATION ADDRESS | TRANSMITTING SOURCE ADDRESS | DESTINATION PORT NUMBER | DESTINATION CARD NUMBER | LEARNING REQUEST INFORMATION GENERATION MANAGEMENT BITS | TRUNK NUMBER | LEARNING REQUEST PRIORITY |

ROUTING APPARATUS

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2007/067262 filed on Sep. 5, 2007, in the Japanese Patent Office, the disclosure of which is hereby incorporated by reference.

FIELD

The present invention relates to a routing apparatus that couples to another routing apparatus via a trunk formed by a plurality of channels.

BACKGROUND

FIG. 1 is a diagram illustrating a structure of an example of a communication network. In FIG. 1, terminal equipments 10 and 11 are respectively coupled to routing apparatuses 12 and 13. The terminal equipments 10 and 11 are end-user terminal equipments which transmit and receive Ethernet (registered trademark) frames and IP frames.

Unique MAC addresses and IP addresses are allocated to the terminal equipments 10 and 11. The MAC address becomes a transmitting source address or a destination address of the Ethernet frame, and the IP address becomes a transmitting source address or a destination address of the IP frame.

The routing apparatuses 12 and 13 form a network system having a trunk structure between the routing apparatuses 12 and 13, in order to achieve a link aggregation (LAG) or a channel redundancy.

The link aggregation couples the routing apparatuses 12 and 13 by two or more links, such as channels 14 and 15, for example, in order to form a single trunk 16, expand the band and speed up the communication. On the other hand, if a fault is generated in one of the channels 14 and 15 forming the trunk 16, the channel redundancy continues the communication via the other of the channels 14 and 15.

The links and the channels are bidirectional communications channels between two apparatuses. For example, the channel 14 illustrated in FIG. 1 enables the communication from the routing apparatus 12 to the routing apparatus 13 and the communication from the routing apparatus 13 to the routing apparatus 12.

The routing apparatuses 12 and 13 have routing tables in which routing information is registered in correspondence with the destination addresses. The routing apparatuses 12 and 13 have a function of registering the transmitting source address and an input port in correspondence with each other in the routing table when the frame is received. The routing table is provided for each input and output card which transmits the frame to and receives the frame from another apparatus (terminal equipment or another routing apparatus, etc).

The routing apparatuses 12 and 13 also have an aging function which deletes routing information (entry) corresponding to a target transmitting source address from the routing table if the frame including the target transmitting source address is not received for a predetermined time (aging time).

Next, a description will be given of the transmission and reception of frames between the terminal equipments 10 and 11.

The terminal equipment 10 transmits a user frame 17 to an input and output card 12a within the routing apparatus 12. This user frame 17 includes the destination address, the transmitting source address, and data, as illustrated in FIG. 2.

In this state, the input and output card 12a within the routing apparatus 12 refers to the routing table of the input and output card 12a using the destination address in the frame 17, and transmits the frame 17 to an input and output card 12c within the routing apparatus 12 via a switch part 12b in accordance with the corresponding routing information registered in the routing table of the input and output card 12.

The input and output card 12c within the routing apparatus 12 receives the frame 17 via the channel 14, and refers to the routing table of the input and output card 12c using the destination address in the frame 17, and transmits the frame 17 to an input and output card 13c within the routing apparatus 13 via the channel 14 in accordance with the corresponding routing information registered in the routing table of the input and output card 12c.

The input and output card 13c within the routing apparatus 13 refers to the routing table within the input and output card 13c using the destination address in the frame 17, and transmits the frame 17 to an input and output card 13a within the routing apparatus 13 via a switch part 13b in accordance with the corresponding routing information registered in the routing table of the input and output card 13c.

The input and output card 13a within the routing apparatus 13 refers to the routing table of the input and output card 13a using the destination address in the frame 17, and transmits the frame 17 to the terminal equipment 11 in accordance with the corresponding routing information registered in the routing table of the input and output card 13a.

Similarly, a frame 18 transmitted from the terminal equipment 11 is transmitted to the terminal equipment 10 via the input and output cards 13a and 13d within the routing apparatus 13, the channel 15, and the input and output cards 12d and 12a within the routing apparatus 12.

The frame 17 is transferred using the channel 14, and the frame 18 is transferred using the channel 15. In other words, the link that is used for the frame transfer is different between the two even within the same trunk.

This is because, the link used to transfer the frames, amongst the plurality of links forming the trunk, is determined independently by the routing apparatus at the transmitting source, and the same link may be determined for the transfer of the frames.

A Japanese Laid-Open Patent Publication No. 2005-184595 proposes an IP packet ring network that learns the MAC address, and finds a shortest route between nodes without using a complex routing protocol.

In addition, a Japanese Laid-Open Patent Publication No. 2005-354598 proposes automatically selecting the shortest route by learning the MAC address from clockwise and counterclockwise routes from a transmitting node in a double ring type transmission apparatus.

In the communication network structure of FIG. 1, when the frame 17 is first input to the input and output card 12a within the routing apparatus 12, a flooding in which the frame is copied and transferred to the input and output cards 12c and 12d other than the input and output card 12a is carried out. Hence, the routing information is learned in the routing tables of the input and output cards 12c and 12d.

Thereafter, a communication format in which the frame 17 is transmitting from the input and output card 12c within the routing apparatus 12 to the input and output card 13c within the routing apparatus 13 via the channel 14 is repeated. If the frame 18 is not transmitted, the routing information with respect to the terminal equipment 10 is deleted from the routing table of the input and output card 12d by the aging function at a time when the aging time is exceeded and the above routing information no longer exists in the routing table of the input and output card 12d.

In this state, if the frame 18 with respect to the terminal equipment 10 is input to the input and output card 12d, the frame 18 is flooded to the input and output cards 12a and 12c from the input and output card 12d because the input and output card 12d no longer has the routing information with respect to the terminal equipment 10, and as a result, there was a problem in that the transmission performance within the routing apparatus 12 deteriorates.

SUMMARY

Accordingly, it is an object in one aspect of the present invention to provide a routing apparatus capable of improving the learning efficiency, suppressing the flooding that is inefficient, and reducing the load on each processing part within the apparatus.

One aspect of the present invention is to provide a routing apparatus that couples to another routing apparatus using a trunk formed by a plurality of channels, and comprises a plurality of input and output cards configured to input and output frames, wherein each input and output card comprises a management table configured to register a transmitting source address, destination information, and a trunk attribute indicating whether a channel used for a transmission has a trunk structure; a learning request part configured to search the management table using a transmitting source address within a frame that is transmitted via the channel, and to generate and supply learning request information having information that is obtained by searching the management table to another input and output card, if the channel used for the transmission has the trunk structure; and a registering part configured to register learning request information supplied thereto in the management table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating a structure of a routing table in the embodiment;

FIG. 6 is a diagram illustrating a structure of a trunk management table in the embodiment;

FIG. 9 is a diagram illustrating learning request information issuing conditions;

FIG. 10 is a diagram illustrating a structure of learning request information of the embodiment;

DESCRIPTION OF EMBODIMENTS

Preferred embodiments of the present invention will be described with reference to the accompanying drawings.

Figure 1:
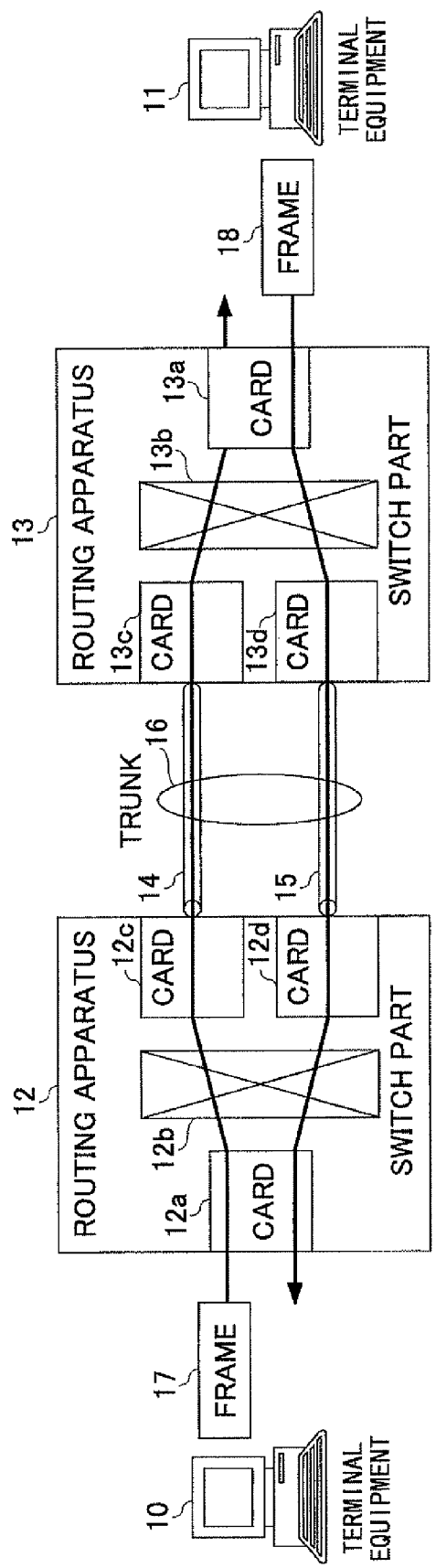
FIG. 1 is a diagram illustrating a structure of an example of a communication network.

The embodiment may be applied to a communication network, such as that illustrated in FIG. 1. In other words, the routing apparatuses 12 and 13 form a network system having the trunk structure between the routing apparatuses 12 and 13, in order to achieve the link aggregation or the channel redundancy.

[Structure of Routing Apparatus]

Figure 3:
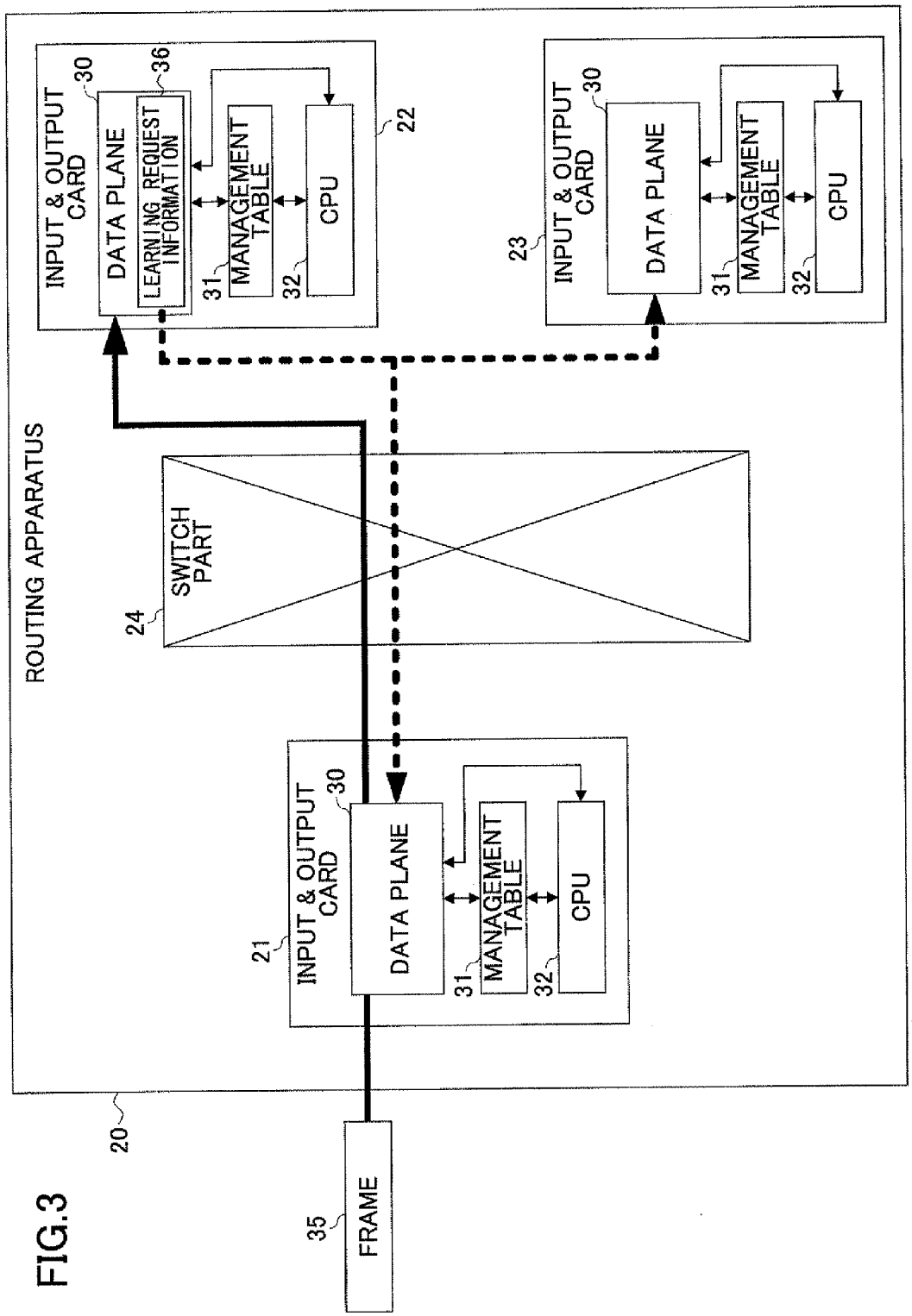
FIG. 3 is a block diagram illustrating a structure of a routing apparatus in an embodiment of the present invention.

FIG. 3 is a block diagram illustrating a structure of a routing apparatus in an embodiment of the present invention. In FIG. 3, a routing apparatus 20 includes a plurality of input and output cards 21, 22 and 23, and a switch part 24.

Each of the input and output cards 21, 22 and 23 include a data plane 30 that inputs and outputs data, a management table 31 that manages routing information and trunk information, and a CPU 32 that carries out various processing.

Figure 2:
FIG. 2 is a diagram illustrating a frame format of a user frame.

When a frame 35 having the structure illustrated in FIG. 2 is input to the input and output card 21 from an external channel, the CPU 32 makes a search in the management table 31 using a transmitting source address in the frame 35 on the data plane 30 in order to judge whether the routing information exists, and transmits the frame 35 to the input and output card indicated by the routing information if the routing information exists, and carries out a flooding in which the frame 35 is transmitted to the input and output cards 22 and 23 other than the input and output card 21 if no routing information exists.

[Structure of Input and Output Card at Egress End]

Figure 4:
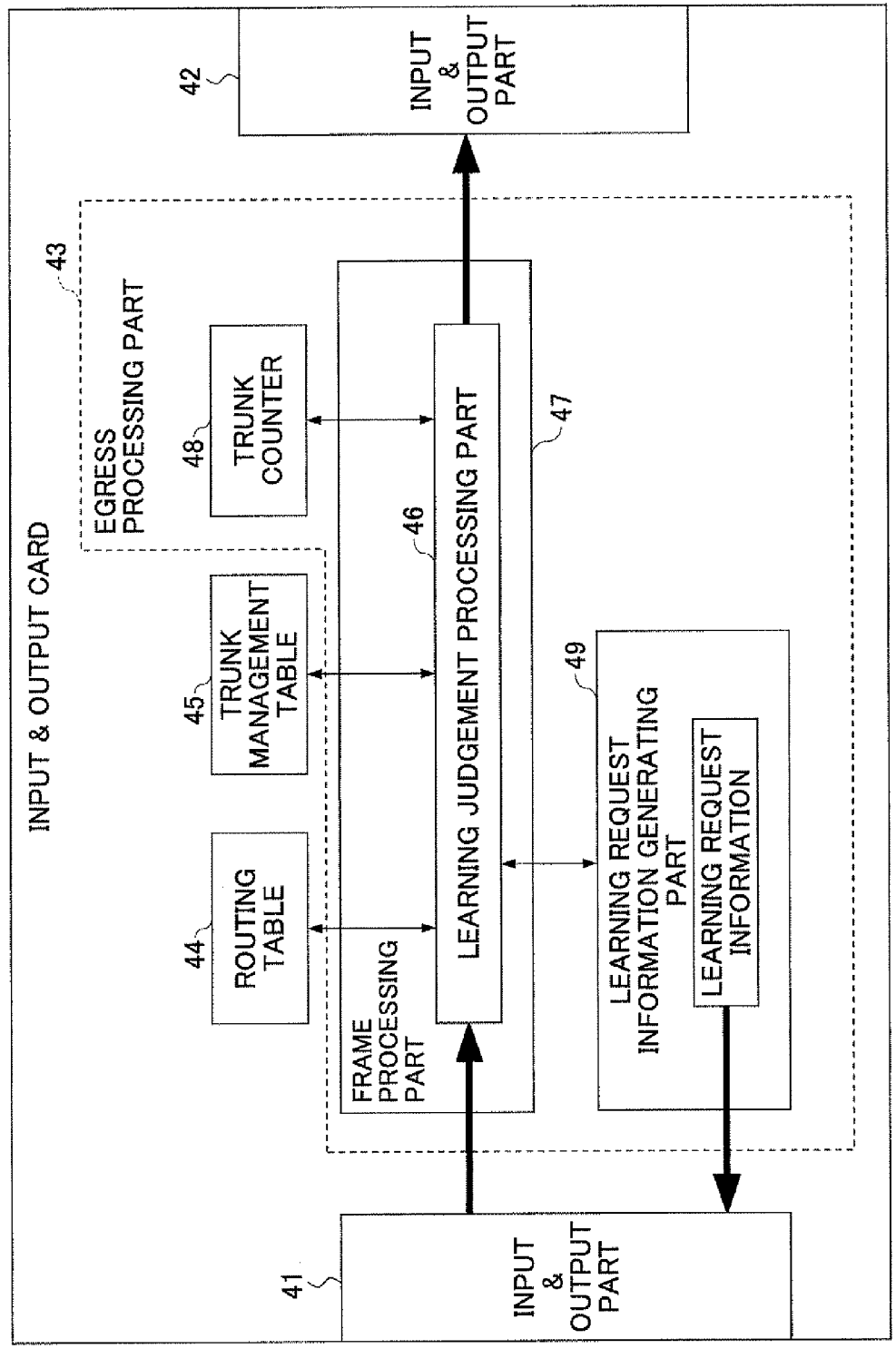
FIG. 4 is a block diagram illustrating a structure of an input and output card in the embodiment.

FIG. 4 is a block diagram illustrating a structure of the input and output card in the embodiment. In FIG. 4, only the egress end that transmits the frame to the channel is illustrated, and the illustration of an ingress end to which the frame is input from the channel is omitted.

The input card of FIG. 4 includes input and output parts 41 and 42, an egress processing part 43, a routing table 44, and a trunk management table 45. The egress processing part 43 includes a frame processing part 47 that has a learning judgement processing part 46, a trunk counter 48, and a learning request information generating part 49.

The input and output parts 41 and 42 correspond to the data plane 40, the egress processing part 43 corresponds to the CPU 32, and the routing table 44 and the trunk management table 45 correspond to the management table 31.

When the frame from the switch part 24 is input to the input and output part 41, the input and output part 41 supplies the frame to the frame processing part 47. The learning judgement processing part 46 within the frame processing part 47 makes a learning judgement by referring to the routing table 44, the trunk management table 45 and the trunk counter 48.

As a result, when learning is required, the learning request information generating part 49 is instructed to generate the learning request information. The learning request information generated by the learning request information generating part 49 is supplied from the input and output part 41 to other input and output cards.

In addition, the frame within the frame processing part 47 is supplied to the input and output part 42, and is transmitted from the input and output part 42 to the channel.

[Routing Table]

FIG. 5 is a diagram illustrating a structure of the routing table 44 in the embodiment. The routing table 44 includes the transmitting source addresses that are used as search keys in entries thereof, and data corresponding to the search keys that are registered therein. The data corresponding to the search keys include destination port numbers and destination card numbers, learning request information generation management bits for managing the generation of learning request information, and a learning request information issuance flag.

The transmitting source address is the transmitting address included in and obtained from the frame. Destination information is formed by the destination port number identifying the port that transmits the frame, and the destination card number identifying the input and output card. The learning request information generation management bits indicate a counted value of the trunk counter 48 at a point in time when the transmitting source address of the frame is registered in the routing table 44. The learning request information issuance flag is "1" when the learning request information is issued, and is "0" when no learning request information is issued.

[Trunk Management Table]

FIG. 6 is a diagram illustrating a structure of the trunk management table 45 in the embodiment. The trunk management table 45 includes the transmitting source addresses that are used as search keys in entries thereof, and data corresponding to the search keys that are registered therein. The data corresponding to the search keys include trunk numbers and learning request priorities.

The trunk number identifies the trunk to which the channel in which the frame having the corresponding transmitting source address is output belongs. If the channel in which the frame is output does not belong to the trunk structure, that is, if the frame is output in a single channel, the trunk number is blank.

The learning request priority indicates the priority of making a registration to the management table 31 when the input and output card receives the learning request information. The priority has a value that is determined in advance in correspondence with the trunk number.

Figure 7:
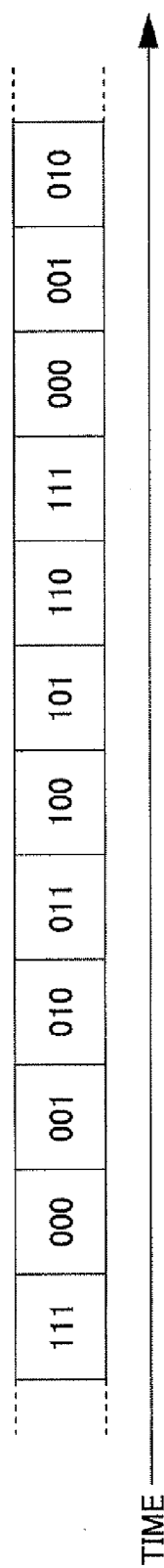
FIG. 7 is a diagram for explaining an operation of a trunk counter.

As illustrated in FIG. 7, the trunk counter 48 is formed by a ring counter whose counted value (for example, 3 bits) is incremented at a period which may be a predetermined time of several minutes to several hours, for example. The trunk counter 48 is formed in correspondence with the aging function, and the routing information that is not referred to within the predetermined time (aging time) by which the counted value of the trunk counter 48 is incremented is deleted from the routing table 44.

[Egress Processing]

Figure 8:
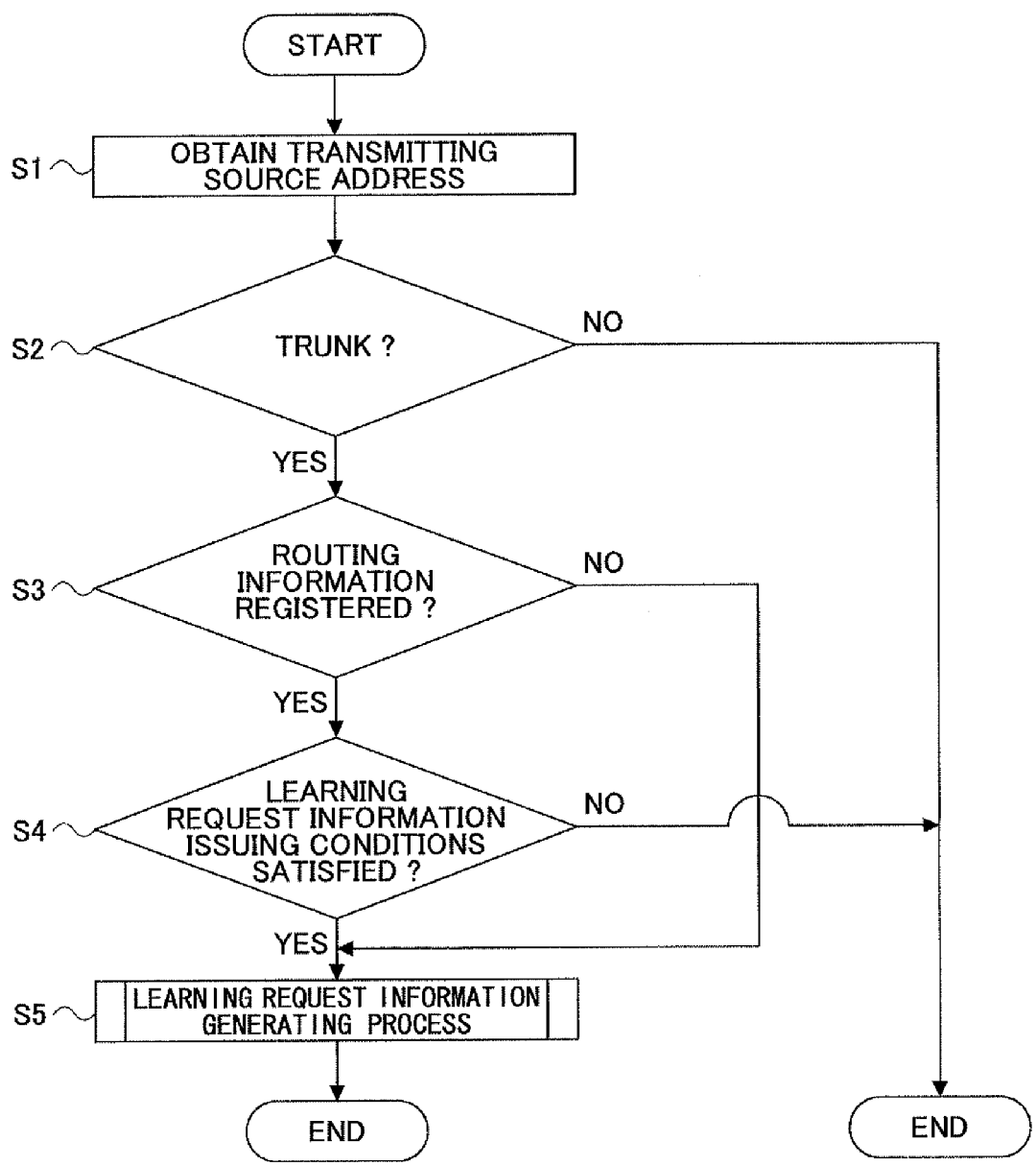
FIG. 8 is a flow chart for explaining a process executed by an egress processing part.

FIG. 8 is a flow chart for explaining a process executed by the egress processing part 43. This process is started when the input and output part 41 supplies the frame to the egress processing part 43.

In a step S1, the learning judgement processing part 46 obtains the transmitting source address from the frame. In a step S2, the learning judgement processing part 46 searches the trunk management table 45 using the transmitting source address, and judges whether the trunk number is registered. If no trunk number is registered, the process ends because the channel in which the frame is transmitted does not have the trunk structure.

On the other hand, if the trunk number is registered and the channel in which the frame is transmitted has the trunk structure, a step S3 is carried out. In the step S3, the learning judgement processing part 46 searches the routing table 44 using the transmitting source address, and judges whether the routing information is registered, that is, whether the destination port number and the destination card number are registered. The process advances to a step if the routing information is registered, and the process advances to a step S5 if no routing information is registered.

In the step S4, the learning judgement processing part 46 judges whether the learning request information issuing conditions are satisfied. The process advances to a step S5 if the conditions are satisfied, and the process ends if the conditions are not satisfied.

FIG. 9 is a diagram illustrating the learning request information issuing conditions. Whether the learning request information issuing conditions are satisfied is judged from the learning request information generation management bits that are obtained by searching the routing table 44, a comparison result between the value indicated by the learning request information generation management bits and the counted value of the trunk counter 48 at that point in time, and the value of the learning request information issuance flag that is obtained by searching the routing table 44.

If the value indicated by the learning request information generation management bits and the counted value of the trunk counter 48 match and the value of the learning request information issuance flag is "1", no learning request information is generated (the conditions are not satisfied), because the predetermined time by which the counted value of the trunk counter 48 is incremented from the time of issuance of the learning request information is on the order of several minutes to several hours, and it is unlikely that the routing information of the target trunk that includes the channel used for the transmission will be deleted by the aging function in another input and output card during this predetermined time.

On the other hand, if the value indicated by the learning request information generation management bits and the counted value of the trunk counter 48 match and the value of the learning request information issuance flag is "0", the learning request information has yet to be issued, and thus, the learning request information is generated (the conditions are satisfied).

If the value indicated by the learning request information generation management bits and the counted value of the trunk counter 48 do not match, the predetermined time has elapsed from the time of issuance of the learning request information, and the routing information of the target trunk that includes the channel used for the transmission may have been deleted by the aging function in another input and output card. Thus, the learning request information is generated (the conditions are satisfied) regardless of the value of the learning request information issuance flag.

In the step S5, the learning request information generating part 49 generates the learning request information based on the data obtained by searching the routing table 44 and the trunk management table 45.

[Learning Request Information]

FIG. 10 is a diagram illustrating a structure of the learning request information of the embodiment. The learning request information includes the destination address, the transmitting source address, the destination port number, the destination card number, the learning request information generation management bits, the trunk number, and the learning request priority.

The destination address indicates the address of the input and output card which becomes the destination. The transmitting source address, the destination port number, the destination card number and the learning request information generation management bits are the data obtained by searching the routing table 44. The trunk number and the learning request priority are the data obtained by searching the trunk management table 45.

The learning request information generated in the learning request information generating part 49 is output from the input and output part 41 to the switch part 24 in the form of packets. In FIG. 3, learning request information 36 that is generated and supplied to the data plane 30 of the input and output card 22 at the egress end is supplied to the data planes 30 of the input and output cards 21 and 23 via the switch part 24.

Figure 11:
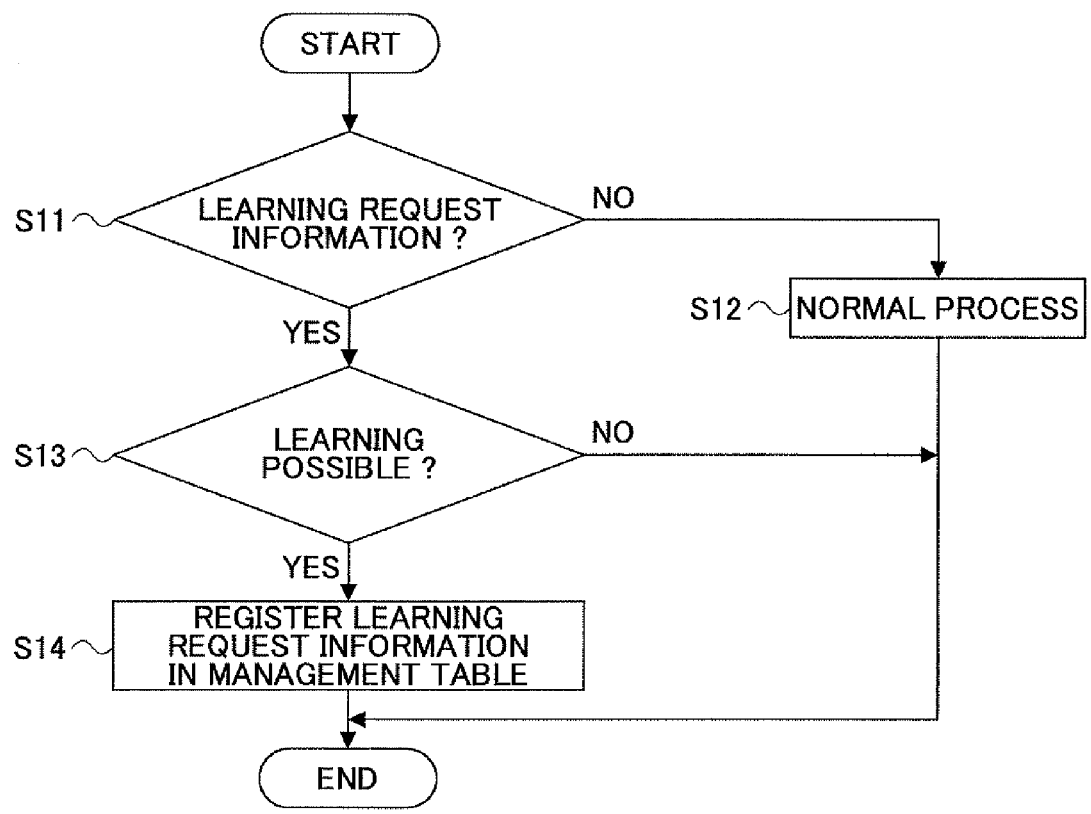
FIG. 11 is a flow chart for explaining a learning process based on the learning request information.

FIG. 11 is a flow chart for explaining a learning process executed by the CPU 32 of the input and output part that receives the learning request information. This learning process is started when the input and output card receives the user frame or the frame of the learning request information in the form of packets.

A step S11 judges whether the received frame is the learning request information in the form of packets, and a step S12 carries out a normal process if the user frame is received. In other words, the routing table 44 in the management table 31 is searched using the destination address of the user frame, and the user frame is transmitted in accordance with the corresponding routing information that is found.

On the other hand, the process advances to a step S13 if the learning request information is received, and the step S13 judges whether the learning of the routing table 44 in the management table 31 is possible. In this example, it is judged that the learning is possible if the routing table 44 has a region for registering the learning request information. In a case where the routing table 44 has no region for registering the learning request information, it is judged that the learning is possible if the trunk management table 45 in the management table 31 includes a transmitting source address with a learning request priority lower than the learning request priority of the learning request information.

If the step S13 judges that the learning is possible, a step S14 registers the destination address, the transmitting source address, the destination port number, the destination card number and the learning request information generation management bits of the learning request information in the routing table 44, and registers the destination address, the trunk number and the learning request priority in the trunk management table 45. The process ends if the step S13 judges that the learning is not possible.

Accordingly, if the value indicated by the learning request information generation management bits and the counted value of the trunk counter 48 do not match, more than the predetermined time has elapsed from the time of issuance of the learning request information. Hence, if there is a possibility that the routing information of the target trunk may have been deleted by the aging function in the other input and output card or, if the learning request information has yet to be issued, the learning request information is generated, and the routing information is newly registered from the other input and output card. Consequently, it is possible to prevent the unwanted flooding caused by the trunk structure, and to prevent the transmission performance within the touring apparatus from deteriorating.

In addition, if there is no possibility that the routing information of the target trunk may have been deleted by the aging function in the other input and output card within the predetermined time of several minutes to several hours from the time of issuance of the learning request information, there is no need to generate the learning request information that is unnecessary.

[Other Structures of Routing Apparatus]

Figure 12:
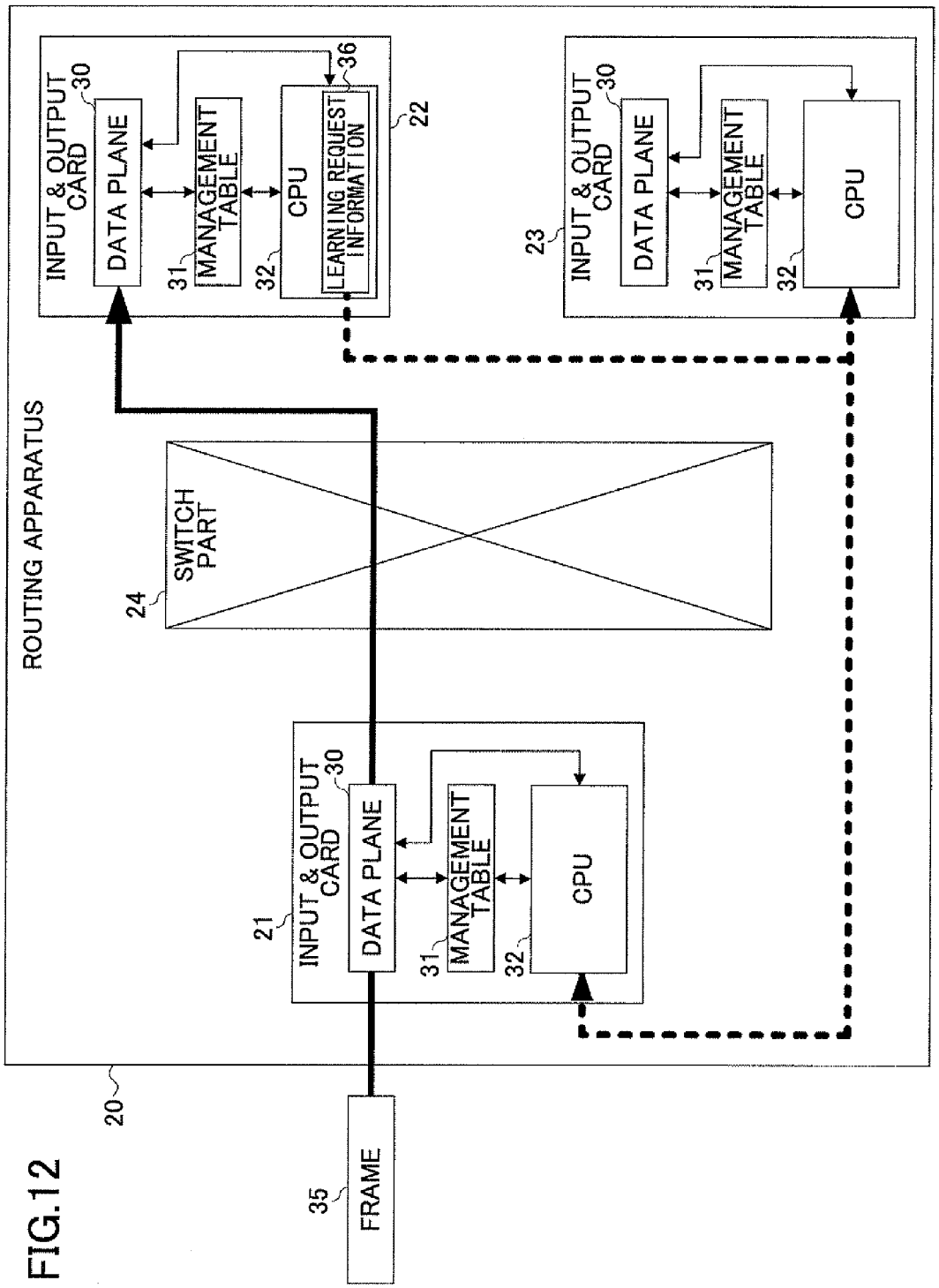
FIG. 12 is a block diagram illustrating a structure of the routing apparatus in another embodiment of the present invention.

FIG. 12 is a block diagram illustrating a structure of the routing apparatus in another embodiment of the present invention. In FIG. 3, the learning request information 36 that is generated and supplied to the data plane 30 of the input and output card 22 is supplied to the input and output cards 21 and 23 via the switch part 24 in the form of packets. But in FIG. 12, the learning request information 36 that is generated in the CPU 32 of the input and output card 22 is supplied directly to the CPUs 32 of the other input and output cards 21 and 23 via a control plane within the routing apparatus 20, such as a PCI bus or an internal LAN.

Figure 13:
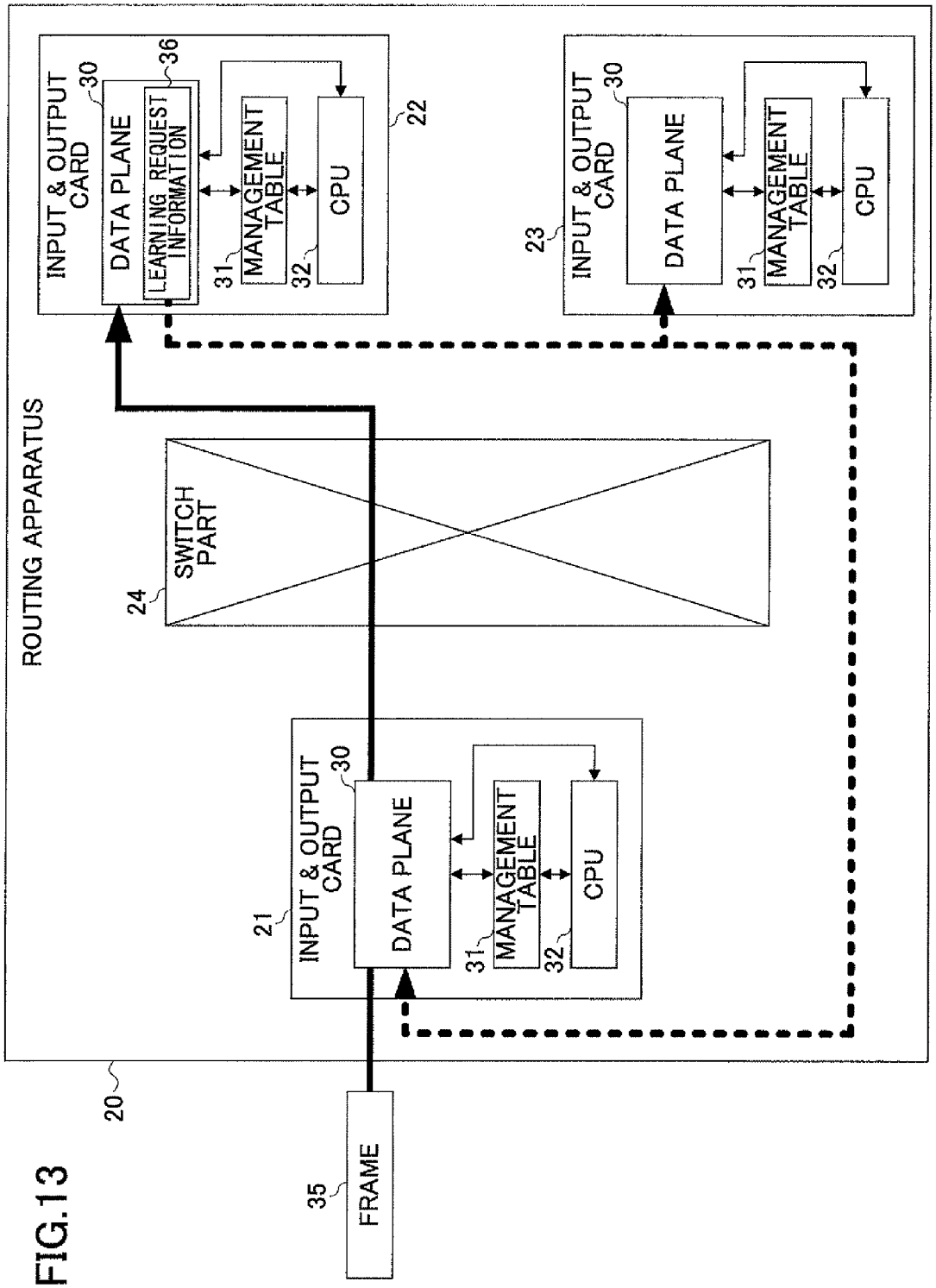
FIG. 13 is a block diagram illustrating a structure of the routing apparatus in still another embodiment of the present invention.

FIG. 13 is a block diagram illustrating a structure of the routing apparatus in still another embodiment of the present invention. In FIG. 3, the learning request information 36 that is generated in the CPU 32 and supplied to the data plane 30 of the input and output card 22 is supplied to the input and output cards 21 and 23 via the switch part 24 in the form of packets. But in FIG. 13, the learning request information 36 that is generated in the CPU 32 of the input and output card 22 is supplied to the data planes 30 of the other input and output cards 21 and 23 via wirings which couple the data planes 30 of the input and output cards 21, 22 and 23 within the routing apparatus 20.

In the embodiments described above, an example of a learning request part (or learning request means) uses the steps S1 through S5, and an example of a registering part (or registering means) uses the steps S11 through S14.

According to the disclosed routing apparatus, it is possible to improve the learning efficiency, suppress the flooding that is inefficient, and reduce the load on each processing part within the apparatus.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A routing apparatus that is connectable to another routing apparatus via a trunk formed by a plurality of channels, comprising:
   a plurality of input and output cards configured to input and output frames, wherein each of the plurality of input and output cards includes:
   a processing unit; and
   a management table configured to register a transmitting source address, destination information, a trunk attribute indicating whether a channel used for a transmission has a trunk structure, and a learning request priority indicating a priority of making a registration to the management table when a first input and output card receives learning request information from a second input and output card, wherein the processing unit includes:
a learning request unit configured to search the trunk attribute and the destination information from the management table using the transmitting source address within a frame that is transmitted by a frame transmission via the channel, and to generate learning request information, to be supplied to a third input and output card, that includes information obtained by searching the management table when the trunk attribute found by the search indicates that the channel used for the frame transmission has the trunk structure and the destination information is found by the search;
a judgment unit configured to judge whether a learning of the management table is possible based on whether a frame that is received by a reception via the channel includes the learning request information from the second input and output card; and
a registering unit configured to register, in the management table, the transmitting source address, the destination information, generation management information indicating time information at a time when the learning request information is issued in the second input and output card, the learning request priority, and the learning request information within the frame that is received by the reception when the judgment unit judges that the learning is possible.

2. The routing apparatus as claimed in claim 1, wherein each of the plurality of input and output cards further includes:
a counter configured to obtain the time information,
wherein said management table further registers a flag indicating whether the learning request information is issued, and generation management information indicating time information at a time when the learning request information is issued in the first input and output card, and
wherein the learning request unit searches the destination information and the flag in the management table using the transmitting source address within the frame that is transmitted by the frame transmission via the channel and generates the learning request information when the destination information is found and the flag indicates that the learning request information is not issued, or the flag indicates that the learning request information is issued but the generation management information corresponding thereto and registered in the management table and the time information obtained by the counter do not match.

3. The routing apparatus as claimed in claim 2, wherein:
the registering unit registers the learning request information received from the second input and output card in the management table depending on the learning request priority within the learning request information.

4. The routing apparatus as claimed in claim 1, wherein the learning request unit supplies the learning request information that is generated therein to the third input and output card via a switch part in a form of packets.

5. The routing apparatus as claimed in claim 1, wherein the learning request unit supplies the learning request information that is generated therein to the third input and output card via a control plane within the routing apparatus.

6. The routing apparatus as claimed in claim 1, wherein the learning request unit supplies the learning request information that is generated therein to the third input and output card via wirings coupling data planes of the plurality of input and output cards within the routing apparatus.

7. The routing apparatus as claimed in claim 2, wherein the counter changes the time information in correspondence with an aging function that deletes information registered in the management table.

8. The routing apparatus as claimed in claim 3, wherein the counter changes the time information in correspondence with an aging function that deletes information registered in the management table.

9. The routing apparatus as claimed in claim 1, wherein the judgment unit judges that the learning is possible when the management table includes a region for registering the learning request information from the second input and output card.

10. The routing apparatus as claimed in claim 1, wherein the judgment unit judges that the learning is possible when the management table includes no region for registering the learning request information but includes a transmitting source address with a learning request priority lower than the learning request priority of the learning request information from the second input and output card.

11. The routing apparatus as claimed in claim 1,
wherein the learning request information includes the transmitting source address, the destination information, the learning request priority, a trunk number, and a flag indicating whether the learning request information is issued,
wherein the destination information includes a destination address of an input and output card at a destination, a destination port number, and a destination card number, and
wherein the trunk number identifies a trunk to which a channel outputting the frame having the transmitting source address belongs.

12. A routing apparatus that is connectable to another routing apparatus via a trunk formed by a plurality of channels, comprising:
a plurality of input and output cards configured to input and output frames, wherein each of the plurality of input and output cards includes:
a processing unit; and
a management table configured to register a transmitting source address, destination information, a trunk attribute indicating whether a channel used for a transmission has a trunk structure, and a learning request priority indicating a priority of making a registration to the management table when a first input and output card receives learning request information from a second input and output card,
wherein the processing unit performs a process that includes:
searching the trunk attribute and the destination information from the management table using the transmitting source address within a frame that is transmitted by a frame transmission via the channel, and generating learning request information, to be supplied to a third input and output card, that includes information obtained by searching the management table when the trunk attribute found by the search indicates that the channel used for the frame transmission has the trunk structure and the destination information is found by the search;
judging whether a learning of the management table is possible based on whether a frame that is received by a reception via the channel includes the learning request information from the second input and output card; and
registering, in the management table, the transmitting source address, the destination information, generation management information indicating time information at a time when the learning request information is issued in the second input and output card, the learning request priority, and the learning request information within the frame that is received by the reception when the judging judges that the learning is possible.

13. The routing apparatus as claimed in claim 12, wherein each of the plurality of input and output cards further includes:

a counter configured to obtain the time information, wherein said management table further registers a flag indicating whether the learning request information is issued, and generation management information indicating time information at a time when the learning request information is issued in the first input and output card, and wherein the searching searches the destination information and the flag in the management table using the transmitting source address within the frame that is transmitted by the frame transmission via the channel and generates the learning request information when the destination information is found and the flag indicates that the learning request information is not issued, or the flag indicates that the learning request information is issued but the generation management information corresponding thereto and registered in the management table and the time information obtained by the counter do not match.

14. The routing apparatus as claimed in claim 13, wherein the registering registers the learning request information received from the second input and output card in the management table depending on the learning request priority within the learning request information.

15. The routing apparatus as claimed in claim 12, wherein the learning request information includes the transmitting source address, the destination information, the learning request priority, a trunk number, and a flag indicating whether the learning request information is issued, wherein the destination information includes a destination address of an input and output card at a destination, a destination port number, and a destination card number, and wherein the trunk number identifies a trunk to which a channel outputting the frame having the transmitting source address belongs.

* * * * *